United States Patent
Cho et al.

(10) Patent No.: US 11,631,839 B2
(45) Date of Patent: Apr. 18, 2023

(54) ELECTRODE FOR SOLID STATE BATTERY AND METHOD FOR MANUFACTURING THE SAME

(71) Applicant: LG CHEM, LTD., Seoul (KR)

(72) Inventors: Sung-Ju Cho, Daejeon (KR); Ho-Suk Shin, Daejeon (KR); Seung-He Woo, Daejeon (KR); Sung-Joong Kang, Daejeon (KR); Hyea-Eun Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 299 days.

(21) Appl. No.: 16/312,812

(22) PCT Filed: Mar. 22, 2018

(86) PCT No.: PCT/KR2018/003307
§ 371 (c)(1),
(2) Date: Dec. 21, 2018

(87) PCT Pub. No.: WO2018/174565
PCT Pub. Date: Sep. 27, 2018

(65) Prior Publication Data
US 2019/0229328 A1    Jul. 25, 2019

(30) Foreign Application Priority Data
Mar. 22, 2017   (KR) .................. 10-2017-0036216

(51) Int. Cl.
*H01M 4/139*   (2010.01)
*H01M 10/0525*   (2010.01)
(Continued)

(52) U.S. Cl.
CPC ............. *H01M 4/139* (2013.01); *H01M 4/04* (2013.01); *H01M 4/13* (2013.01); *H01M 4/62* (2013.01);
(Continued)

(58) Field of Classification Search
CPC ........... H01M 4/02–139; H01M 4/621; H01M 10/0525
(Continued)

(56) References Cited

U.S. PATENT DOCUMENTS 6,368,746 B1   4/2002   Takada et al.
6,537,468 B1   3/2003   Hata et al.
(Continued)

FOREIGN PATENT DOCUMENTS

CN   1304429 A   7/2001
CN   101861674 A1   10/2010
(Continued)

OTHER PUBLICATIONS

EPO machine English translation of KR-20170012962 originally published to Choi Jeong Lee on Jul. 27, 2015 (Year: 2015).*
(Continued)

*Primary Examiner* — Cynthia H Kelly
*Assistant Examiner* — Niara Trant
(74) *Attorney, Agent, or Firm* — Birch, Stewart, Kolasch & Birch, LLP

(57) ABSTRACT

An electrode for a solid state battery is provided. The electrode active material layer of the electrode shows improved mechanical properties, such as elasticity or rigidity, of the electrode layer through the crosslinking of a binder resin. Thus, it is possible to inhibit or reduce the effect of swelling and/or shrinking of the electrode active material during charging/discharging. Therefore, the interfacial adhesion between the electrode active material layer and an (Continued)

electrolyte layer and the interfacial adhesion between the electrode active material layer and a current collector are maintained to a high level to provide a solid state battery having excellent cycle characteristics.

12 Claims, 4 Drawing Sheets

(51) Int. Cl.
   *H01M 4/04*     (2006.01)
   *H01M 4/62*     (2006.01)
   *H01M 4/13*     (2010.01)
(52) U.S. Cl.
   CPC ....... *H01M 4/621* (2013.01); *H01M 10/0525* (2013.01)
(58) Field of Classification Search
   USPC .......................................................... 429/218
   See application file for complete search history.

(56) References Cited

U.S. PATENT DOCUMENTS

| | | | |
|---|---|---|---|
| 9,434,801 B2* | 9/2016 | Choi | ................. B32B 27/28 |
| 2007/0202403 A1 | 8/2007 | Oh et al. | |
| 2008/0131776 A1 | 6/2008 | Sakuma et al. | |
| 2009/0023065 A1 | 1/2009 | Hwang et al. | |
| 2011/0159366 A1 | 6/2011 | Nakura | |
| 2012/0177997 A1 | 7/2012 | Nakamoto et al. | |
| 2012/0202051 A1 | 8/2012 | Iseki et al. | |
| 2014/0127579 A1* | 5/2014 | Yoshida | ................. H01B 1/122 429/217 |
| 2014/0162140 A1* | 6/2014 | Hoshiba | ............ H01M 10/0562 429/304 |
| 2015/0086875 A1 | 3/2015 | Yoshida | |
| 2015/0280238 A1 | 10/2015 | Hellring et al. | |
| 2015/0280239 A1* | 10/2015 | Hellring | ................. C09J 133/06 429/332 |
| 2016/0149261 A1 | 5/2016 | Zaghib et al. | |
| 2016/0359195 A1 | 12/2016 | Makino et al. | |
| 2017/0133713 A1* | 5/2017 | Makino | ............... H01M 4/0404 |
| 2017/0301950 A1 | 10/2017 | Mimura et al. | |
| 2018/0108913 A1* | 4/2018 | Zhang | .................... H01M 4/38 |

FOREIGN PATENT DOCUMENTS

| | | | |
|---|---|---|---|
| CN | 102627921 | A | 8/2012 |
| JP | 11-238503 | A | 8/1999 |
| JP | 2000-123874 | A | 4/2000 |
| JP | 2003-22839 | A | 1/2003 |
| JP | 2006-261041 | A | 9/2006 |
| JP | 2011-134675 | A | 7/2011 |
| JP | WO2016/129427 | A1 | 8/2016 |
| KR | 10-0790833 | B1 | 1/2008 |
| KR | 100846139 | B1 * | 7/2008 |
| KR | 10-1386163 | B1 | 4/2014 |
| KR | 10-2014-0074181 | A | 6/2014 |
| KR | 10-2015-0002589 | A | 1/2015 |
| KR | 10-2015-0136397 | A | 12/2015 |
| KR | 10-2016-0021831 | A | 2/2016 |
| KR | 10-2016-0119194 | A | 10/2016 |
| KR | 10-2016-0138552 | A | 12/2016 |
| KR | 20170012962 | A * | 2/2017 |
| WO | WO 2006/080259 | A1 | 8/2006 |
| WO | WO 2013/052911 | A1 | 4/2013 |
| WO | WO 2016/129427 | A1 | 8/2016 |
| WO | WO 2016/210371 | A1 | 12/2016 |

OTHER PUBLICATIONS

EPO machine English translation of KR100846139 originally published to Kim Wan Keun on Mar. 27, 2007 (Year: 2007).*
EGA Academy . (Feb. 3, 2017). What are the regulatory definitions for "ambient", "room temperature" and "Cold chain"? https://www.gmp-compliance.org/gmp-news/what-are-the-regulatory-definitions-for-ambient-room-temperature-and-cold-chain (Year: 2017).*
International Search Report (PCT/ISA/210) issued in PCT/KR2018/003307, dated Jun. 29, 2018.

* cited by examiner

ELECTRODE FOR SOLID STATE BATTERY AND METHOD FOR MANUFACTURING THE SAME

TECHNICAL FIELD

The present application claims priority to Korean Patent Application No. 10-2017-0036216 filed on Mar. 22, 2017 in the Republic of Korea. The present disclosure relates to a battery for an electrochemical device which shows improved adhesion to prevent separation of an electrode active material, and a method for manufacturing the same.

BACKGROUND ART

A lithium ion secondary battery has been used widely as an electric power source system for portable electronic instruments. In addition, recently, there is a tendency to use a lithium ion secondary battery as a battery for electric vehicles or industrial battery. The structure of a lithium ion secondary battery is relatively simple and includes the three main elements of a negative electrode active material, a positive electrode active material and an electrolyte. As lithium ions move from a positive electrode to a negative electrode and from the negative electrode to the positive electrode, operation of the battery is performed. The electrolyte portion merely functions as a lithium ion conductor. In a widely used lithium ion secondary battery, an electrolyte solution containing a lithium salt dissolved in an aprotic organic solvent is used. However, such an electrolyte solution causes some problems during use, including leakage of the electrolyte or gas generation. Thus, there has been a need to develop a solid state battery to solve the above-mentioned problems.

As compared to a battery using an electrolyte solution, a solid electrolyte is advantageous in that it provides improved stability, a battery having an optimized structure, high energy density, high output density, or the like. However, a solid state battery has a small ion conduction channel due to low interfacial contact with an electrode, and thus is problematic in that it causes a decrease in ion conductivity. Particularly, a sulfide-based inorganic solid electrolyte, such as LPS or LGPS, which is a lithium ion conductor is damaged by a polar solvent or water, and thus undergoes a decrease in its unique conductivity. Therefore, when manufacturing an electrode for a solid state battery, a nonpolar organic solvent is used in order to prevent such a decrease in conductivity of the lithium ion conductor. However, in the case of a currently used binder resin, such as PVDF-HFP or SBR, it is dissolved in a polar solvent, such as NMP or water, but is not dissolved in a nonpolar solvent, such as toluene or xylene. Therefore, when manufacturing an electrode for a solid state battery, a rubber-based binder relatively soluble to a nonpolar solvent is used as a binder for an electrode. However, in the case of such a rubber-based binder, use of a nonpolar solvent causes a problem of degradation of adhesion.

DISCLOSURE

Technical Problem

The present disclosure is directed to providing an electrode for a solid state battery which shows improved binding force of an electrode binder to prevent separation of an active material and lithium ion conductor in the electrode, and a method for manufacturing the same. These and other objects and advantages of the present disclosure may be understood from the following detailed description. Also, it will be easily understood that the objects and advantages of the present disclosure may be realized by the means shown in the appended claims and combinations thereof.

Technical Solution

To solve the above-mentioned technical problem, the present disclosure provides a method for manufacturing an electrode.

According to an embodiment of the present disclosure, the method for manufacturing an electrode for a solid state battery includes the following steps (S10)-(S40) of: (S10) preparing a slurry for forming an electrode layer including an electrode active material, a binder resin, a crosslinking initiator, an inorganic solid electrolyte and a solvent; (S20) applying the slurry for forming an electrode layer to the surface of a current collector, followed by drying, to form an electrode layer (a); (S30) pressing the electrode layer (a) to form an electrode layer (a'); and (S40) warming the electrode layer (a') to form an electrode layer (a"), wherein step (S20) is carried out in a temperature range where no crosslinking is initiated, and step (S40) is carried out in a temperature range where crosslinking of the electrode layer (a") is initiated and performed.

According to a second embodiment of the present disclosure, there is provided the method for manufacturing an electrode for a solid state battery of the first embodiment, wherein the solvent in step (S10) is a nonpolar solvent.

According to a third embodiment of the present disclosure, there is provided the method for manufacturing an electrode for a solid state battery of any one of the first or the second embodiment, wherein the binder resin includes a rubber-based resin.

According to a fourth embodiment of the present disclosure, there is provided the method for manufacturing an electrode for a solid state battery of any one of the first to the third embodiments, wherein the slurry further includes a conductive material.

According to a fifth embodiment of the present disclosure, there is provided the method for manufacturing an electrode for a solid state battery of any one of the first to the fourth embodiments, wherein the crosslinking initiator is an organic peroxide-based crosslinking initiator.

According to a sixth embodiment of the present disclosure, there is provided the method for manufacturing an electrode for a solid state battery of any one of the fifth embodiment, wherein the organic peroxide-based crosslinking initiator is at least one selected from the group consisting of dicumyl peroxide (DCP), di(2-ethylhexyl)peroxydicarbonate, di(4-t-butylcyclohexyl)peroxydicarbonate, di-sec-butylperoxydicarbonate, t-butylperoxyneodecanoate, t-hexylperoxy pivalate, t-butylperoxy pivalate, dilauroyl peroxide, di-n-octanoyl peroxide, 1,1,3,3,-tetramethyl-butylperoxy-2-ethylhexanoate, di(4-methylbenzoyl) peroxide, dibenzoyl peroxide, t-butylperoxyisobutyrate and 1,1-di(t-hexylperoxy)cyclohexane.

According to a seventh embodiment of the present disclosure, there is provided the method for manufacturing an electrode for a solid state battery of any one of the first to the sixth embodiments, wherein step (S40) is carried out under vacuum.

In another aspect, there is provided an electrode for a solid state battery. According to an eighth embodiment, there is provided an electrode for a solid state battery which is obtained by the method as defined in any one of the first to the seventh embodiments and includes the current collector and the electrode layer (a") formed on at least one surface of the current collector, wherein the electrode layer (a") includes the electrode active material, the inorganic solid electrolyte and the binder resin, the electrode active material particles and the inorganic solid electrolyte particles in the electrode layer are fixed and integrated through surface-surface binding and point-point binding by the binder resin, and the binder resin is further crosslinked.

According to a ninth embodiment, there is provided the electrode for a solid state battery of the eighth embodiment, wherein the binder resin includes a rubber-based binder resin.

According to a tenth embodiment, there is provided the electrode for a solid state battery of the ninth embodiment, wherein the rubber-based binder resin includes at least one selected from the group consisting of natural rubber, butyl rubber, bromobutyl rubber, chlorobutyl rubber, styrene isoperene rubber, styrene-ethylene-butyrene-styrene rubber, acrylonitrile-butadiene-styrene rubber, polybutadiene rubber, nitrile butadiene rubber, styrene butadiene rubber, styrene butadiene styrene (SBS) rubber, ethylene propylene diene monomer (EPDM) rubber and hydrogenated nitrile butadiene rubber (HNBR).

Advantageous Effects

The electrode for a solid state battery obtained from the method according to the present disclosure maintains ion conductivity to a high level, and shows high binding force of the binder to prevent separation of the electrode active material and lithium ion conductor in the electrode. In addition, the interfacial adhesion between the current collector and the electrode active material layer is improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shapes, sizes, scales or ratios of the elements in the accompanying drawing may be exaggerated for the purpose of more clear description.

BEST MODE

Figure 1:
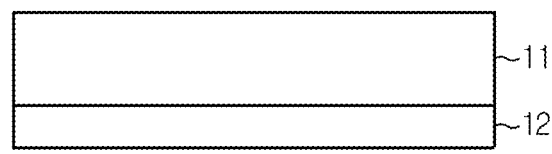
FIG. 1 is a schematic view illustrating the structure of an electrode for a solid state battery according to the present disclosure.

Hereinafter, preferred embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

It will be understood that the terms "comprises" and/or "comprising", or "includes" and/or "including" when used in this specification, refer to the presence of any stated element, but do not preclude the addition of one or more other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

In the following specification, specific terms are used for convenience and are not limiting. Such terms as 'right', 'left' 'top surface' and 'bottom surface' refer to the directions as shown in the drawings to which reference is made. Such terms as 'internally' and 'externally' refer to the directions toward or away from the geometrical centers of the designated devices, systems and members thereof. The terms 'front', 'rear', 'up', 'down' and related words and phrases refer to the locations and bearings in the drawing to which reference is made and are not limiting. The same is also applied to the above-listed words, derivatives thereof and synonyms thereof.

The present disclosure relates to an electrode for an electrochemical device and an electrochemical device including the same. For example, the electrochemical device may be a lithium ion secondary battery, particularly a solid state battery using a solid electrolyte, such as a polymer electrolyte and/or inorganic solid electrolyte as an electrolyte.

FIG. 1 is a schematic view illustrating the section of the electrode according to an embodiment of the present disclosure. Referring to FIG. 1, the electrode 10 is provided with an electrode active material layer 11 on at least one surface of a current collector 12. The electrode active material layer includes an electrode active material, a solid electrolyte, a binder resin and a conductive material, wherein the binder resin is crosslinked. According to the present disclosure, the electrode may be a positive electrode or a negative electrode. The solid electrolyte may be present in an amount of 5-100 parts by weight based on 100 parts by weight of the electrode active material. According to an embodiment of the present disclosure, the solid electrolyte may be present in an amount of 10 parts by weight or more, 20 parts by weight or more, 30 parts by weight or more or 40 part by weight or more, and 90 parts by weight or less, 80 parts by weight or less, 70 parts by weight or less, or 60 parts by weight or less. In addition, the binder resin may be present in an amount of 0.1-10 parts by weight based on 100 parts by weight of the electrode active material layer. Further, the conductive material may be present in an amount of 0.1-10 parts by weight based on 100 parts by weight of the electrode active material layer.

According to an embodiment of the present disclosure, the electrode active material layer shows improved mechanical properties, such as elasticity or rigidity, of the electrode layer through the crosslinking of the binder resin. Thus, it is possible to inhibit or reduce the effect of swelling and/or shrinking of the electrode active material during charging/discharging. Therefore, the interfacial adhesion between the electrode active material layer and the electrolyte layer and the interfacial adhesion between the electrode active material layer and the current collector are maintained to a high level to provide a solid state battery having excellent cycle characteristics.

According to an embodiment, the binder resin includes a rubber-based binder resin. As described hereinafter, the rubber-based binder resin can be dissolved in a nonpolar solvent to provide an electrode slurry.

According to the present disclosure, when the electrode is a positive electrode, the positive electrode active material may include any one selected from: a layered compound such as lithium manganese composite oxide ($LiMn_2O_4$, $LiMnO_2$, etc.), lithium cobalt oxide ($LiCoO_2$) or lithium nickel oxide ($LiNiO_2$), or a compound substituted with one or more transition metals; lithium manganese oxide such as $Li_{1+x}Mn_{2-x}O_4$ (wherein x is 0-0.33), $LiMnO_3$, $LiMn_2O_3$ or $LiMnO_2$, or the like; lithium copper oxide ($Li_2CuO_2$); vanadium oxide, such as $LiV_3O_8$, $LiFe_3O_4$, $V_2O_5$, $Cu_2V_2O_7$, or the like; Ni-site type lithium nickel oxide represented by the chemical formula of $LiNi_{1-x}M_xO_2$ (wherein M=Co, Mn, Al, Cu, Fe, Mg, B or Ga, and x=0.01-0.3); lithium manganese composite oxide represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which a part of Li is substituted with alkaline earth metal ions; disulfide compound; and $Fe_2(MoO_4)_3$, or a combination of two of more of them. However, the positive electrode active material is not limited thereto.

According to the present disclosure, the electrode may be a negative electrode. Herein, the negative electrode active material may include any one selected from: carbon such as non-graphitizable carbon or graphite-based carbon; metal composite oxides, such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, elements of Group 1, 2 or 3 in the Periodic Table, halogen; 0<x≤1; 1≤y≤3; 1≤z≤8); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide, or a combination of two or more of them. However, the negative electrode active material is not limited thereto.

According to an embodiment of the present disclosure, the electrode may be a negative electrode. In addition, the negative electrode may use copper foil as a current collector. In the case of a negative electrode, copper foil including copper is used generally as a current collector. Such a copper-made current collector highly tends to be separated from an electrode active material layer due to its surface properties. Thus, according to the present disclosure, the interfacial adhesion to a current collector is increased through the crosslinking of an electrode active material layer. Therefore, when the electrode according to the present disclosure is a negative electrode and/or when the method for manufacturing an electrode according to the present disclosure is applied to a negative electrode, there is provided an effect of improving the interfacial adhesion between an electrode active material and a current collector.

The binder resin may include a rubber-based binder resin. As mentioned above, since a PVdF-based binder resin or acrylic binder resin currently used as a binder for an electrode has low solubility to a nonpolar solvent, it is difficult to prepare an electrode slurry. Therefore, according to the present disclosure, a rubber-based resin having high solubility to a nonpolar solvent is used as a binder. According to an embodiment of the present disclosure, the rubber-based binder resin may include at least one selected from the group consisting of natural rubber, butyl rubber, bromobutyl rubber, chlorobutyl rubber, styrene isoperene rubber, styrene-ethylene-butyrene-styrene rubber, acrylonitrile-butadiene-styrene rubber, polybutadiene rubber, nitrile butadiene rubber, styrene butadiene rubber, styrene butadiene styrene (SBS) rubber, ethylene propylene diene monomer (EPDM) rubber and hydrogenated nitrile butadiene rubber (HNBR).

According to an embodiment of the present disclosure, the solid electrolyte is not particularly limited and may include at least one inorganic solid electrode, such as a crystalline solid electrolyte, non-crystalline solid electrolyte or glass ceramic solid electrolyte. According to an embodiment of the present disclosure, the solid electrolyte may include a sulfide-based solid electrolyte including sulfur and particular examples thereof include lithium sulfide, silicon sulfide, germanium sulfide and boron sulfide. Particular examples of the inorganic solid electrolyte include a LPS type solid electrolyte, such as $Li_2S$—$P_2S_5$, $Li_{3.833}Sn_{0.833}As_{0.166}S_4$, $Li_4SnS_4$, $Li_{3.25}Ge_{0.25}P_{0.75}S_4$, $B_2S_3$—$Li_2S$, $xLi_2S$-(100-x)$P_2S_5$ (x=70-80), $Li_2S$—$SiS_2$—$Li_3N$, $Li_2S$—$P_2S_5$—LiI, $Li_2S$—$SiS_2$—LiI, $Li_2S$—$B_2S_3$—LiI, $Li_3N$, LISICON, LIPON ($Li_{3+y}PO_{4-x}N_x$), Thio-LISICON ($Li_{3.25}Ge_{0.25}P_{0.75}S_4$), $Li_2O$—$Al_2O_3$—$TiO_2$—$P_2O_5$ (LATP), or the like.

According to an embodiment of the present disclosure, particular examples of the conductive material include any one selected from the group consisting of graphite, carbon black, carbon fibers or metallic fibers, metal powder, conductive whisker, conductive metal oxide, activated carbon and polyphenylene derivatives, or a combination of two or more of such conductive materials. More particularly, the conductive material may include any one selected from the group consisting of natural graphite, artificial graphite, super-p, acetylene black, ketjen black, channel black, furnace black, lamp black, thermal black, denka black, aluminum powder, nickel powder, zinc oxide, potassium titanate and titanium oxide, or a combination of two or more of such conductive materials.

The current collector is not particularly limited, as long as it has high conductivity while not causing any chemical change in the corresponding battery. Particular examples of the current collector include stainless steel, copper, aluminum, nickel, titanium, baked carbon, or aluminum or stainless steel surface-treated with carbon, nickel, titanium, silver, or the like.

In another aspect, there is provided an electrode assembly for an electrochemical device including at least one of the above-described electrode, and an electrochemical device including the electrode assembly. For example, the electrochemical device may be a solid state battery. According to an embodiment of the present disclosure, particular examples of the electrochemical device may include a secondary battery for electric vehicles (EV) and/or a secondary battery for electric power storage systems (ESS). In addition, the electrode assembly may be a high-capacity electrode assembly which shows a capacity of 2,400 mAh or more.

Figure 2:
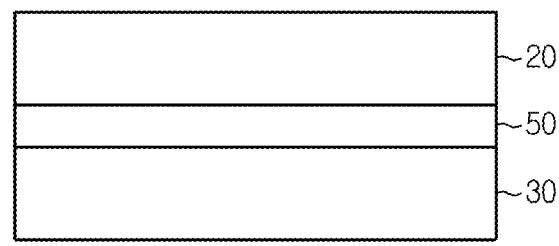
FIG. 2 is a schematic view illustrating the electrode assembly for a solid state battery according to the present disclosure.

FIG. 2 is a schematic view illustrating the electrode assembly according to an embodiment of the present disclosure. Referring to FIG. 2, the electrode assembly 100 includes a positive electrode 20, a negative electrode 30 and a solid electrolyte layer 50 interposed between the positive electrode and the negative electrode. In the electrode assembly, the positive electrode and/or the negative electrode may be an electrode having the above-described characteristics according to the present disclosure.

In the electrode assembly, description about the electrodes may be the same as described above. In addition, according to an embodiment of the present disclosure, the solid electrolyte layer may use an inorganic solid electrolyte and/or polymer electrolyte as a solid electrolyte. The inorganic solid electrolyte may be any solid electrolyte material currently used in the field of solid state batteries and may include an oxide-based solid electrolyte and/or a sulfide-based solid electrolyte. The sulfide-based solid electrolyte is the same as described above. In addition, the polymer electrolyte may be selected suitably from ion conductive polymer materials for electrolyte. According to an embodiment of the present disclosure, the solid electrolyte layer 50 may include a solid electrolyte and an electrolyte binder. The electrolyte binder may be a nonpolar resin having no polar functional group. Therefore, the electrolyte binder is inactive to a highly reactive solid electrolyte, particularly to a sulfide-based solid electrolyte. The electrolyte layer 50 may not cause swelling/shrinking due to charging/discharging, like the electrode active material. In addition, when a material other than the solid electrolyte is incorporated to the solid electrolyte layer, the grain boundary resistance between solid electrolyte particles tends to be increased. Thus, no crosslinking agent may be added when forming the solid electrolyte layer.

According to an embodiment of the present disclosure, particular examples of the electrolyte binder may include styrene-based thermoplastic elastomers, such as styrene butadiene styrene (SBS) block polymer, styrene ethylene butadiene styrene (SEBS) block polymer or styrene-styrene butadiene-styrene block polymer, styrene butadiene rubber (SBR), butadiene rubber (BR), natural rubber (NR), isoprene rubber (IR), ethylene-propylene-diene monomer (EPDM) terpolymer, and partially hydrogenated products thereof. In addition, the electrolyte binder may include at least one selected from polystyrene, polyolefin, olefinic thermoplastic elastomer, polycycloolefin, silicone resin, nitrile rubber (NBR), chloroprene rubber (CR) and partially or totally hydrogenated products thereof, polyacrylate copolymers, polyvinylidene fluoride (PVDF), vinylidene fluoride-co-hexafluoropropylene (VDF-HFP) and carboxylic acid-modified products thereof, chloropolyethylene (CM), polymethacrylate, polyvinyl alcohol, ethylene-vinyl alcohol copolymer, polyimide, polyamide and polyamideimide.

In still another aspect, there is provided a method for manufacturing an electrode for a solid state battery.

According to the present disclosure, a nonpolar solvent is used to prepare an electrode slurry and use of a polar solvent is avoided. Thus, it is possible for a solid electrolyte to maintain a high level of ion conductivity without degradation thereof. In addition, according to the present disclosure, the electrode includes a rubber-based binder resin as a binder and the rubber-based binder resin is subjected to intermolecular crosslinking and shows improved binding force. Thus, it is possible to prevent the problem of separation of an electrode active material or solid electrolyte particles from an electrode.

Figure 4:
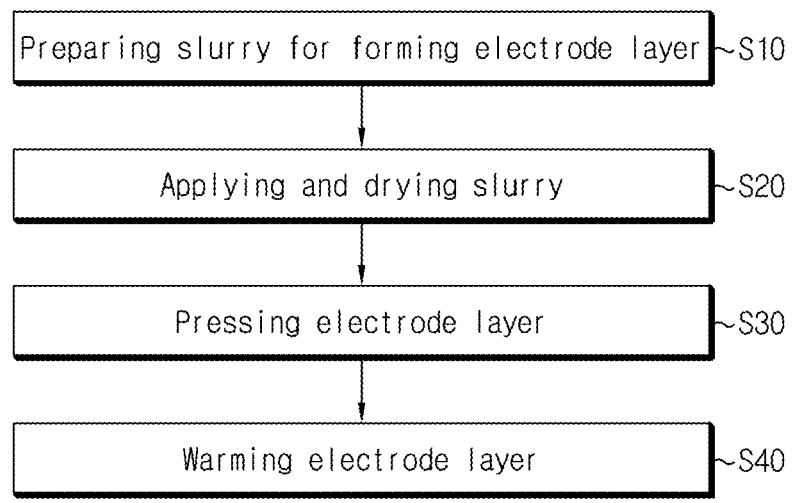
FIG. 4 is a flow chart of the method for manufacturing an electrode for a solid state battery according to the present disclosure.
Figure 5:
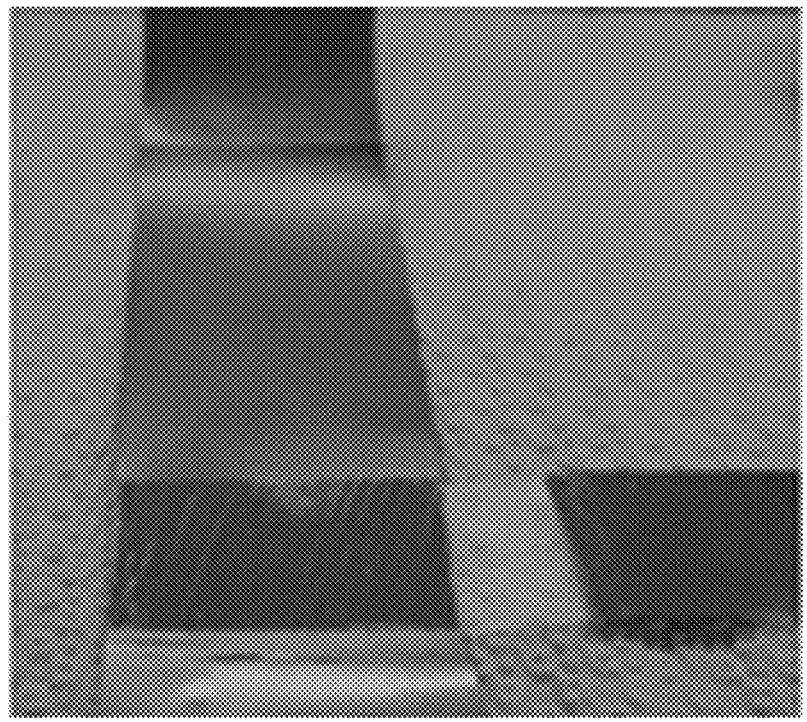
FIG. 5 is a photographic image illustrating the results of a peel test of the electrode according to Example 1.
Figure 6:
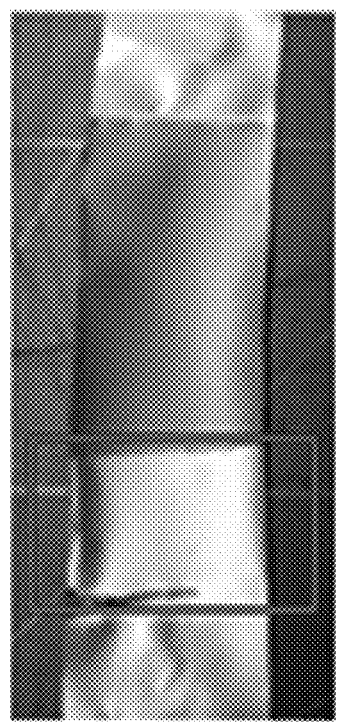
FIG. 6 is a photographic image illustrating the results of a peel test of the electrode according to Comparative Example 1.

FIG. 4 is a flow chart illustrating the method for manufacturing an electrode for a solid state battery according to the present disclosure. Hereinafter, the method for manufacturing an electrode for a solid state battery will be explained in detail with reference to FIG. 4.

First, a slurry for forming an electrode layer including an electrode active material, a binder resin, a crosslinking initiator, an inorganic solid electrolyte and a solvent is prepared (S10). The crosslinking initiator is preferably present in an amount of 0.1-20 parts by weight based on 100 parts by weight of the binder resin.

According to an embodiment of the present disclosure, the solvent includes a nonpolar solvent and use of a polar solvent, such as water or NMP, is preferably avoided in the process for manufacturing an electrode. According to an embodiment of the present disclosure, the solvent includes a nonpolar solvent that may have a polarity index of 0-3.0 and/or a dielectric constant less than 5. According to an embodiment of the present disclosure, particular examples of the solvent may include any one selected from pentane, cyclohexane, toluene, benzene, xylene, hexane, anisole, heptane, chloroform, diethyl ether and butyl butyrate, or a combination of two or more such nonpolar solvents. The method for manufacturing an electrode according to the present disclosure uses no polar solvent, such as water or NMP, and thus can prevent a decrease in ion conductivity of a sulfide-based solid electrolyte.

According to an embodiment, the crosslinking initiator is a material capable of crosslinking the binder resin to form a three-dimensional network structure. According to the present disclosure, an organic peroxide-based initiator is used as a crosslinking initiator. In the case of vulcanization crosslinking using a sulfur ingredient as a crosslinking agent, sulfur is not dissolved in a (nonpolar) organic solvent during the preparation of an electrode slurry. Therefore, when using a nonpolar organic solvent as a solvent for preparing a slurry, it is difficult to obtain a slurry. In addition, in the case of vulcanization crosslinking using a sulfur ingredient, it is required to carry out crosslinking at a high temperature of 160° C. or higher, thereby providing low processability. In addition, under an excessively high temperature condition, the electrode active material or binder resin may be deteriorated, which may lead to degradation of the performance of a battery.

Particular examples of the organic peroxide-based crosslinking initiator may include at least one selected from the group consisting of dicumyl peroxide (DCP), di(2-ethylhexyl)peroxydicarbonate, di(4-t-butylcyclohexyl) peroxydicarbonate, di-sec-butylperoxydicarbonate, t-butylperoxyneodecanoate, t-hexylperoxy pivalate, t-butylperoxy pivalate, dilauroyl peroxide, di-n-octanoyl peroxide, 1,1,3,3-tetramethylbutylperoxy-2-ethylhexanoate, di(4-methylbenzoyl) peroxide, dibenzoyl peroxide, t-butylperoxyisobutyrate and 1,1-di(t-hexylperoxy)cyclohexane.

According to an embodiment of the present disclosure, the crosslinking agent may be present in an amount of 0.1-30 parts by weight based on 100 parts by weight of the binder resin. Within the above-defined range, the amount of the crosslinking agent may be controlled to 0.5 parts by weight or more, 1 part by weight or more, 2 parts by weight or more, 3 parts by weight or more, 5 parts by weight or more, or 10 parts by weight or more. The amount of the crosslinking agent may also be controlled to 25 parts by weight or less, 20 parts by weight or less, 15 parts by weight or less, 10 parts by weight or less, or 7 parts by weight or less, within the above-defined range. For example, the crosslinking agent may be introduced in an amount of 2-10 parts by weight.

Next, the prepared slurry is applied to at least one surface of a current collector and dried to form an electrode layer (a) (S20). After applying the slurry, the solvent is dried to solidify the electrode layer (a). The drying may be carried out at room temperature, or if desired, the electrode may be heated to accelerate the removal of the solvent. However, it is required to control the drying step to be carried out in a temperature range where the crosslinking initiator does not react.

Then, the electrode layer (a) obtained from step (S20) is pressed to obtain an electrode layer (a') (S30). As used herein, the electrode layer (a') refers to the electrode layer (a) after it is pressurized in this step. By virtue of the pressurization, the electrode active material, solid electrolyte particles and the conductive material are bound closely to each other in the electrode to improve the ion conductivity and electron conductivity. In addition, by virtue of the pressing, the electrode may have an air permeability controlled to a range of 4 sec/100 cc to 3600 sec/100 cc, 100 sec/100 cc to 1000 sec/100 cc, or 200 sec/100 cc to 800 sec/100 cc.

After that, the electrode (a') obtained from step (S30) is warmed to carry out crosslinking of the binder resin through the crosslinking agent, thereby forming an electrode layer (a'') (S40). As used herein, electrode layer (a'') refers to the electrode layer (a') warmed through this step so that the binder resin may be further crosslinked in the electrode layer. As described above, a nonpolar solvent causes no problem of degradation of ion conductivity of a solid electrolyte but causes a problem of degradation of binding force of a rubber-based binder. Therefore, according to the present disclosure, the binder is crosslinked to improve the binding characteristics.

In this step, the heating is carried out at a temperature controlled to 45° C.-150° C. and is controlled to a temperature range where crosslinking is initiated and performed within the above-defined range. The crosslinking time may be controlled adequately depending on heating temperature and may be carried out to complete the crosslinking. According to an embodiment of the present disclosure, the crosslinking may be carried out for 1-100 minutes, 1-60 minutes, 1-20 minutes, or 1-15 minutes.

Figure 3:
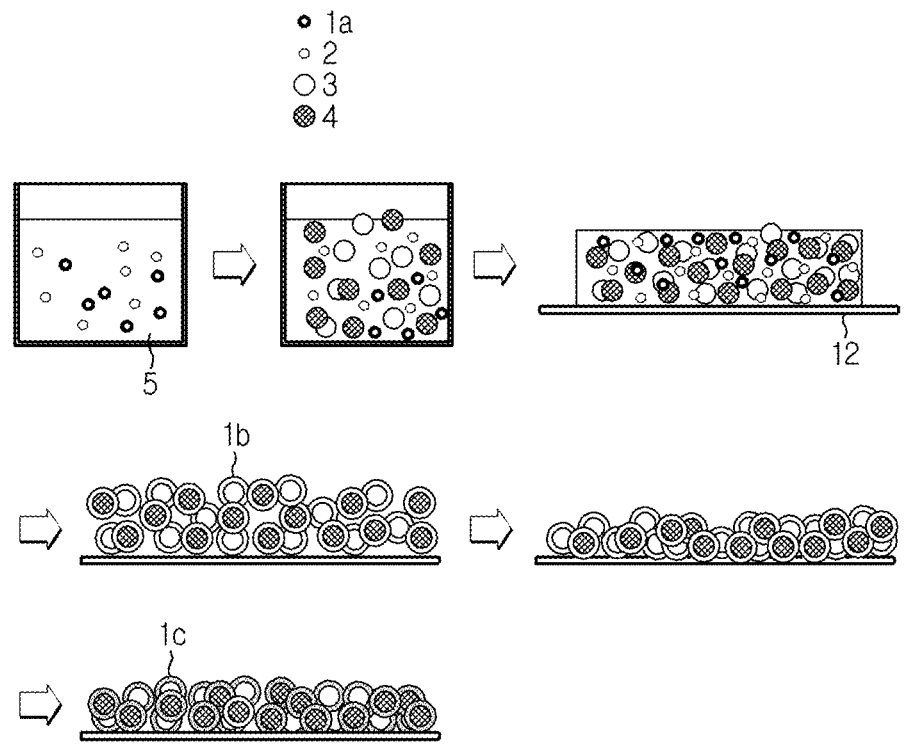
FIG. 3 is a schematic view illustrating the method for manufacturing an electrode for a solid state battery according to the present disclosure.

FIG. 3 is a schematic view illustrating the method for manufacturing an electrode according to the present disclosure. Referring to FIG. 3, a binder resin 1a, a crosslinking initiator 2, a solid electrolyte 3 and an electrode active material 4 are added to a nonpolar solvent 5 to form a slurry for forming an electrode layer, which, in turn, is applied to the surface of a current collector, followed by drying. The electrode active material and solid electrolyte contained in the dried electrode active material layer are totally or at least partially surface-coated with the binder resin 1b. Next, the dried electrode active material layer is pressurized under a predetermined pressure and heated to crosslink the binder resin 1b. By virtue of the pressurization, the ingredients forming the electrode, such as the electrode active material, are bound closely to each other in the electrode to improve the ion conductivity and electron conductivity. In addition, by virtue of the pressing, it is possible to control the air permeability of the electrode to a desired level. Meanwhile, in FIG. 3, drawing numeral 1c distinctively represents a binder resin which is crosslinked through this step.

As described above, the electrode according to the present disclosure shows improved interfacial adhesion between the electrode active material layer and the current collector and/or solid electrolyte layer facing the same. Therefore, when applying the electrode to a battery, the electrode has improved physical stability during charging/discharging to reduce resistance during the initial charging, to decrease a deviation in discharge capacity and to improve voltage stability.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

Preparation Example 1-1. Manufacture of Negative Electrode

Natural graphite (AGP8), VGCF, polybutadiene rubber (BR) and hydrogenated nitrile butadiene rubber (HNBR) were introduced to xylene at a weight ratio of 94:2:3.96:0.04 and subjected to mortar mixing to obtain a homogeneous negative electrode slurry. During the mixing of the slurry, dicumyl peroxide (DCP) was added as a crosslinking initiator. The DCP solution (40% in xylene) was added in an amount of 5 parts by weight based on 100 parts by weight of BR and HNBR (based on solid content). The slurry was applied to copper foil to a thickness of 250 μm and carrying out drying at 25° C. After removing the solvent, the resultant product was warmed to about 130° C. and allowed to stand for about 10 minutes to initiate and perform crosslinking. Then, roll pressing was carried out four times with a roll interval of 0 μm.

Preparation Example 1-2: Manufacture of Positive Electrode $LiCo_2O_3$ was used as a positive electrode active material. The positive electrode active material, VGCF, BR and hydrogenated nitrile butadiene rubber (HNBR) were introduced to xylene at a weight ratio of 94:2:3.96:0.04 and then agitated to obtain a homogeneous positive electrode slurry. During the agitation of the slurry, dicumyl peroxide (DCP) was added as a crosslinking initiator. The DCP solution (40% in xylene) was added in an amount of 5 parts by weight based on 100 parts by weight of BR and HNBR (based on solid content). The slurry was applied to aluminum foil to a thickness of 250 μm and carrying out drying at 25° C. After removing the solvent, the resultant product was warmed to about 130° C. and allowed to stand for about 10 minutes to initiate and perform crosslinking. Then, roll pressing was carried out four times with a roll interval of 0 μm to obtain a positive electrode.

Preparation Example 2-1

A negative electrode was obtained in the same manner as described in Preparation Example 1-1, except that no DCP was added.

Preparation Example 2-2

A positive electrode was obtained in the same manner as described in Preparation Example 1-2, except that no DCP was added.

EXAMPLE

A separator (separator made of polyethylene, thickness: 20 μm) was interposed between the negative electrode obtained from Preparation Example 1-1 and lithium metal to form an electrode assembly. In addition, 1M $LiPF_6$ dissolved in an organic solvent (ethylene carbonate:diethyl carbonate=3:7, volume ratio) was used as an electrolyte to manufacture a coin-type half-cell. Further, the same electrodes were used to manufacture two sets of cells designated as Example 1 and Example 2.

Comparative Example

A separator (separator made of polyethylene, thickness: 20 μm) was interposed between the negative electrode obtained from Preparation Example 2-1 and lithium metal to form an electrode assembly. In addition, 1M $LiPF_6$ dissolved in an organic solvent (ethylene carbonate:diethyl carbonate=3:7, volume ratio) was used as an electrolyte to manufacture a coin-type half-cell. Further, the same electrodes were used to manufacture two sets of cells designated as Comparative Example 1 and Comparative Example 2.

Evaluation of Peel Strength

Each of the electrodes obtained from Preparation Examples was determined for the peel strength at the interface between the electrode layer and the current collector. The peel strength was evaluated by the 90° peel test using a tensile tester.

TABLE 1

|  | Prep. Ex. 1-1 | Prep. Ex. 1-2 | Prep. Ex. 2-1 | Prep. Ex. 2-2 |
| --- | --- | --- | --- | --- |
| Adhesion (gf) | 60 | 500 | Not available | 200 |

Preparation Example 1-1 and Preparative Example 2-1 use copper film as a current collector. According to the test results, the electrode according to Preparation Example 1-1 shows significantly higher adhesion as compared to the electrode according to Preparation Example 2-1. In addition, in Preparation Example 1-2 and Preparation Example 2-2 using aluminum foil as a current collector, the electrode according to the present disclosure, Preparation Example 1-2, shows higher adhesion. In this test, the electrodes according to Preparation Example 2-2 show higher adhesion as compared to the electrode according to Preparation Example 1-1. However, this results from the use of a different current collector material. It is shown that when using the same current collector material, the electrode according to the present disclosure shows higher adhesion.

Charge/Discharge Evaluation

Figure 7:
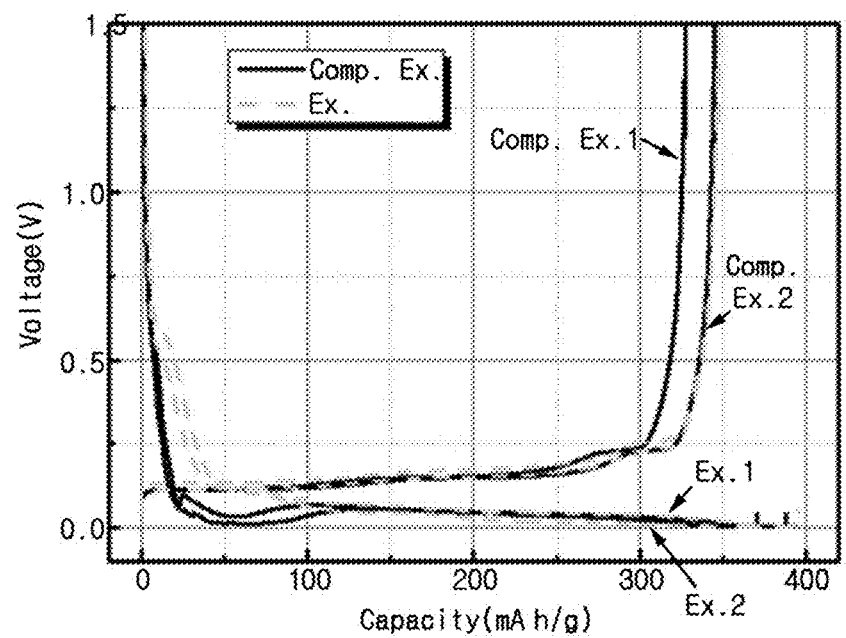
FIG. 7 is a graph illustrating the charge/discharge profile of each of the batteries according to Examples and Comparative Examples.

Then, each cell was charged to 0.005 V at 0.1 C in a constant current-constant voltage (CC-CV) mode (charging is terminated when the current reaches 0.05 C), and discharged to 1.5V at 0.1 C in a constant current mode to determined charge/discharge cycle characteristics of each negative electrode. The results are shown in FIG. 7. Referring to FIG. 7, it is shown that each of the cells according to Examples is excellent in terms of a decrease in resistance upon the initial charging, a decrease in deviation of discharge capacity and an increase in voltage stability, as compared to the cells according to Comparative Examples. It can be seen from FIG. 7 that the cells according to Examples show a smaller decrease in voltage upon the initial charging as compared to Comparative Examples. This results from a decrease in resistance of the electrode. In other words, the cells according to Examples show lower resistance as compared to the cells according to Comparative Examples. In addition, the two sets corresponding to Examples (Examples 1 and 2) have the same discharge capacity. On the contrary, the two sets corresponding to Comparative Examples (Comparative Examples 1 and 2) show a difference in discharge capacity of about 20 mAh/g, as shown in the graph. In addition, Comparative Examples show an unstable voltage curve upon the initial charging. On the contrary, Examples allow stable charging. This is because the electrode has improved physical stability by virtue of the crosslinking of the electrode.

| [Description of Drawing Numerals] | |
| --- | --- |
| 1a, 1b, 1c: Binder resin | 2: Crosslinking initiator |
| 3: Solid electrolyte | 4: Electrode active material |
| 5: Nonpolar solvent | 10: Negative electrode |
| 11: Electrode active material layer | 12: Current collector |
| 100: Electrode assembly | 20: Positive electrode |
| 50: Solid electrolyte layer | 30: Negative electrode |

What is claimed is:

1. A method for manufacturing an electrode, comprising the following sequential steps (S10)-(S40) of:
(S10) preparing a slurry for forming an electrode layer comprising an electrode active material, a binder resin, a crosslinking initiator, an inorganic solid electrolyte and a solvent;
(S20) applying the slurry for forming an electrode layer to the surface of a current collector, followed by drying, to form an electrode layer (a);
(S30) pressing the electrode layer (a) to form an electrode layer (a'); and
(S40) warming the electrode layer (a') to form an electrode layer (a"),
wherein the drying in step (S20) is carried out at room temperature where no crosslinking is initiated, and step (S40) is carried out at a temperature range of 45° C.–150° C. where crosslinking of the electrode layer (a") is initiated and performed;
wherein the binder resin comprises a rubber-based binder resin;
wherein the crosslinking initiator is an organic peroxide-based crosslinking initiator which is at least one selected from the group consisting of dicumyl peroxide (DCP), di(2-ethylhexyl)peroxydicarbonate, di(4-t-butylcyclohexyl)peroxydicarbonate, di-secbutylperoxydicarbonate, t-butylperoxyneodecanoate, t-hexylperoxy pivalate, t-butylperoxy pivalate, dilauroyl peroxide, di-n-octanoyl peroxide, 1,1,3,3,-tetramethylbutylperoxy-2-ethylhexanoate, di(4-methylbenzoyl) peroxide, dibenzoyl peroxide, t-butylperoxyisobutyrate and 1,1-di(t-hexylperoxy)cyclohexane;
wherein the inorganic solid electrolyte comprises a sulfide-based solid electrolyte;
wherein the solvent in step (S10) is a nonpolar solvent; and
wherein the solvent in step (S10) excludes polar solvents.

2. The method for manufacturing an electrode according to claim 1, wherein the slurry further comprises a conductive material.

3. The method for manufacturing an electrode according to claim 1, wherein the organic peroxide-based crosslinking initiator is at least dicumyl peroxide (DCP).

4. The method for manufacturing an electrode according to claim 1, wherein step (S40) is carried out under vacuum.

5. An electrode for a solid state battery obtained by the method as defined in claim 1, which comprises the current collector and the electrode layer (a″) formed on at least one surface of the current collector, wherein the electrode layer (a″) comprises the electrode active material, the inorganic solid electrolyte and the binder resin, the electrode active material particles and the inorganic solid electrolyte particles in the electrode layer are fixed and integrated through surface-surface binding and point-point binding by the binder resin, and the binder resin is further crosslinked.

6. The electrode for a solid state battery according to claim 5, wherein the rubber-based binder resin comprises at least one selected from the group consisting of natural rubber, butyl rubber, bromobutyl rubber, chlorobutyl rubber, styrene isoperene rubber, styrene-ethylene-butyrene-styrene rubber, acrylonitrile-butadiene-styrene rubber, polybutadiene rubber, nitrile butadiene rubber, styrene butadiene rubber, styrene butadiene styrene (SBS) rubber, ethylene propylene diene monomer (EPDM) rubber and hydrogenated nitrile butadiene rubber (HNBR).

7. The method for manufacturing an electrode according to claim 1, wherein the nonpolar solvent is selected from the group consisting of pentane, cyclohexane, toluene, benzene, xylene, hexane, anisole, heptane, chloroform, diethyl ether and butyl butyrate, and mixtures thereof.

8. The method for manufacturing an electrode according to claim 1, wherein the nonpolar solvent is toluene, xylene, or a mixture thereof.

9. The method for manufacturing an electrode according to claim 1, wherein the rubber based binder resin comprises at least one selected from the group consisting of natural rubber, butyl rubber, bromobutyl rubber, chlorobutyl rubber, styrene isoperene rubber, styrene-ethylene-butyrenestyrene rubber, acrylonitrile-butadiene-styrene rubber, polybutadiene rubber, nitrile butadiene rubber, styrene butadiene rubber, styrene butadiene styrene (SBS) rubber, ethylene propylene diene monomer (EPDM) rubber and hydrogenated nitrile butadiene rubber (HNBR).

10. The method for manufacturing an electrode according to claim 1, wherein the rubber based binder resin comprises at least one selected from the group consisting of vinylidene fluorideco-hexafluoropropylene, styrene butadiene rubber and mixtures thereof.

11. The method for manufacturing an electrode according to claim 1, wherein the sulfide based solid electrolyte is selected from the group consisting of lithium sulfide, silicon sulfide, germanium sulfide and boron sulfide.

12. The method for manufacturing an electrode according to claim 1, wherein the sulfide based solid electrolyte is selected from the group consisting of $Li_2S$—$P_2S_5$, $Li_{3.833}Sn_{0.833}AS_{0.166}S_4$, $Li_4SnS_4$, $Li_{3.25}Ge_{0.25}P_{0.75}S_4$, $B_2S_3$—$Li_2S$, $xLi_2S$-$(100-x)P_2S_5$ (x=70-80), $Li_2S$—$SiS_2$—$Li_3N$, $Li_2S$—$P_2S_5$—$LiI$, $Li_2S$—$SiS_2$—$LiI$, $Li_2S$—$B_2S_3$—$LiI$, $Li_3N$, LISICON, LIPON ($Li_{3+y}PO_{4-x}N_x$), Thio-LISICON ($Li_{3.25}Ge_{0.25}P_{0.75}S_4$), and $Li_2O$—$Al_2O_3$—$TiO_2$—$P_2O_5$ (LATP).

* * * * *